United States Patent
Ishikawa et al.

(10) Patent No.: US 11,630,746 B2
(45) Date of Patent: Apr. 18, 2023

(54) SUBSTITUTION APPARATUS, SUBSTITUTION CONTROL PROGRAM, AND SUBSTITUTION METHOD

(71) Applicants: AutoNetworks Technologies, Ltd., Yokkaichi (JP); Sumitomo Wiring Systems, Ltd., Yokkaichi (JP); Sumitomo Electric Industries, Ltd., Osaka (JP)

(72) Inventors: Fumiya Ishikawa, Yokkaichi (JP); Yukihiro Miyashita, Yokkaichi (JP); Hiroshi Ueda, Yokkaichi (JP); Naoki Adachi, Yokkaichi (JP); Shinichi Aiba, Yokkaichi (JP); Shogo Kamiguchi, Yokkaichi (JP)

(73) Assignees: AutoNetworks Technologies, Ltd., Yokkaichi (JP); Sumitomo Wiring Systems, Ltd., Yokkaichi (JP); Sumitomo Electric Industries, Ltd., Osaka (JP)

(*) Notice: Subject to any disclaimer, the term of this patent is extended or adjusted under 35 U.S.C. 154(b) by 75 days.

(21) Appl. No.: 17/438,198

(22) PCT Filed: Jan. 15, 2020

(86) PCT No.: PCT/JP2020/001054
§ 371 (c)(1),
(2) Date: Sep. 10, 2021

(87) PCT Pub. No.: WO2020/183897
PCT Pub. Date: Sep. 17, 2020

(65) Prior Publication Data
US 2022/0206909 A1    Jun. 30, 2022

(30) Foreign Application Priority Data
Mar. 11, 2019  (JP) .............................. JP2019-044034

(51) Int. Cl.
*G06F 11/20*       (2006.01)
*B60W 50/02*      (2012.01)
*B60W 50/023*    (2012.01)

(52) U.S. Cl.
CPC ....... *G06F 11/2028* (2013.01); *B60W 50/023* (2013.01); *B60W 50/0205* (2013.01); *B60W 50/0225* (2013.01); *G06F 2201/85* (2013.01)

(58) Field of Classification Search
CPC ............ G06F 11/2028; G06F 2201/85; G06F 11/0739; G06F 11/0751; G06F 11/203;
(Continued)

(56) References Cited

U.S. PATENT DOCUMENTS

| 2014/0297109 A1 | 10/2014 | Shimomura et al. |
| 2015/0113638 A1* | 4/2015 | Valasek ................. G06F 21/562 726/22 |
| 2016/0297401 A1* | 10/2016 | Haga ..................... H04L 9/0891 |

FOREIGN PATENT DOCUMENTS

| JP | 2008-168649 A | 7/2008 |
| JP | 5784786 B1 | 9/2015 |
| JP | 2018-182767 A | 11/2018 |

OTHER PUBLICATIONS

International Search Report, Application No. PCT/JP2020/001054, dated Mar. 31, 2020. ISA/Japan Patent Office.

* cited by examiner

*Primary Examiner* — Marthe Y Marc-Coleman
(74) *Attorney, Agent, or Firm* — Honigman LLP (57) ABSTRACT

A substitution apparatus for installation in a vehicle in which a plurality of in-vehicle control apparatuses are implemented, the substitution apparatus including a control unit and a substitute unit. The control unit is configured to control the substitute unit based on transmission data transmitted from the in-vehicle control apparatuses, specify an abnormal
(Continued)

in-vehicle control apparatus based on the transmission data, disable the specified abnormal in-vehicle control apparatus, and apply, to the substitute unit, a program for exhibiting functions otherwise normally executed by the specified abnormal in-vehicle control apparatus. The substitute unit is configured to substitute for the disabled in-vehicle control apparatus by executing the applied program.

19 Claims, 5 Drawing Sheets

(58) Field of Classification Search
CPC .............. G06F 2201/815; G06F 11/36; B60W 50/0205; B60W 50/0225; B60W 50/023; B60W 2050/0006
See application file for complete search history.

SUBSTITUTION APPARATUS, SUBSTITUTION CONTROL PROGRAM, AND SUBSTITUTION METHOD

CROSS-REFERENCE TO RELATED APPLICATIONS

This application is the U.S. national stage of PCT/JP2020/001054 filed on Jan. 15, 2020, which claims priority of Japanese Patent Application No. JP 2019-044034 filed on Mar. 11, 2019, the contents of which are incorporated herein.

TECHNICAL FIELD

The present disclosure relates to a substitution apparatus, a substitution control program, and a substitution method.

BACKGROUND

ECUs (Electronic Control Units), which are for controlling in-vehicle devices in systems such as power-train systems for engine control or the like and body systems for air conditioning control or the like, are installed in a vehicle. Each ECU includes an arithmetic processing unit such as an MPU, a re-writable non-volatile storage unit such as a RAM, and a communication unit for communicating with another ECU, and controls an in-vehicle device by reading and executing a control program stored in the storage unit thereof. A fraudulent message is detected by any one ECU of the ECUs installed in the vehicle determining whether or not a message transmitted from another ECU is a valid message, and if a fraudulent message is detected, the fraudulent message is overwritten with an error frame while a data frame is being received (see JP 2018-182767A for example).

The ECU disclosed in JP 2018-182767A can overwrite an unauthorized message from an abnormal or unauthorized ECU that has transmitted the fraudulent message, but no consideration is given to substituting for functions that the abnormal ECU originally performs in the normal state.

SUMMARY

An object of the present disclosure is to provide a substitution apparatus and the like that substitutes for functions of an ECU when an abnormal ECU is detected.

A substitution apparatus is provided. The substitute apparatus is for installation in a vehicle in which a plurality of in-vehicle control apparatuses are implemented. The substitution apparatus includes a control unit; and a substitute unit. The control unit is configured to control the substitute unit based on transmission data transmitted from the plurality of in-vehicle control apparatuses, specify an abnormal in-vehicle control apparatus based on the transmission data, disable the specified abnormal in-vehicle control apparatus, and apply, to the substitute unit, a program for exhibiting a function otherwise normally executed by the specified abnormal in-vehicle control apparatus. The substitute unit is configured to substitute for the disabled in-vehicle control apparatus by executing the applied program, and wherein the control unit does not include the substitute unit in a relay path for relaying the transmission data transmitted from the plurality of in-vehicle control apparatuses, before the program is applied to the substitute unit, includes the substitute unit in the relay path after applying the program to the substitute unit, and changes relay path information stored in a storage unit of the own apparatus based on execution or stoppage of substitution processing performed by the substitute unit.

DETAILED DESCRIPTION OF PREFERRED EMBODIMENTS

First, embodiments of the present disclosure will be listed and illustrated. At least some of the embodiments to be described below may be combined as appropriate.

A substitution apparatus according to one aspect of the present disclosure is a substitution apparatus for installation in a vehicle in which a plurality of in-vehicle control apparatuses are implemented, the substitution apparatus including: a control unit; and a substitute unit, wherein the control unit is configured to control the substitute unit based on transmission data transmitted from the plurality of in-vehicle control apparatuses, specify an abnormal in-vehicle control apparatus based on the transmission data, disable the specified abnormal in-vehicle control apparatus, and apply, to the substitute unit, a program for exhibiting a function otherwise normally executed by the specified abnormal in-vehicle control apparatus, and the substitute unit is configured to substitute for the disabled in-vehicle control apparatus by executing the applied program.

In this aspect, the control unit disables the specified abnormal in-vehicle control apparatus, and applies a program for exhibiting the function otherwise normally performed by the abnormal in-vehicle control apparatus to the substitute unit. The substitute unit to which the program has been applied substitutes for the disabled in-vehicle control apparatus by executing the program. Accordingly, the abnormal in-vehicle control apparatus can be disabled to prevent other in-vehicle apparatuses or the vehicle from being affected, and the substitute unit can be caused to substitute for and exhibit functions otherwise normally exhibited by the abnormal in-vehicle control apparatus.

The substitution apparatus according to one aspect of the present disclosure, wherein the plurality of in-vehicle control apparatuses are communicably connected to the control unit using a CAN or Ethernet communication protocol, and the substitute unit is communicably connected to the control unit using the CAN and Ethernet communication protocols.

In this aspect, the substitute unit is communicably connected to the control unit using the CAN and Ethernet communication protocols, and thus both an in-vehicle control apparatus using CAN and an in-vehicle control apparatus using Ethernet as the communication protocol can be substituted for.

The substitution apparatus according to one aspect of the present disclosure, wherein the control unit does not include the substitute unit in a relay path for relaying the transmission data transmitted from the plurality of in-vehicle control apparatuses, before the program is applied to the substitute unit, and includes the substitute unit in the relay path after applying the program to the substitute unit.

In this aspect, when the communication between in-vehicle control apparatuses is being relayed, the control unit does not include the substitute unit in the relay path for relaying before the program for substituting the abnormal in-vehicle control apparatus is applied to the substitute unit. Accordingly, transmission data from the in-vehicle control apparatuses is not relayed to the substitute unit, and thus, even if the transmission data includes unauthorized data or the like, the robustness of the substitute unit with respect to unauthorized data or the like can be guaranteed.

The substitution apparatus according to one aspect of the present disclosure, wherein the substitute unit substitutes for an in-vehicle control apparatus that performs processing for generating data to be output based on data obtained via a communication path for communication with another in-vehicle control apparatus, and outputting the generated data via the communication path.

In this aspect, the in-vehicle control apparatus substitutes for the in-vehicle control apparatus that performs processing for generating data to be output based on data obtained via a communication path for communication with another in-vehicle control apparatus, and outputting the generated data via the communication path. That is, the in-vehicle control apparatus is not an in-vehicle control apparatus that is directly connected, via a wire harness or the like, to a control-target in-vehicle apparatus such as a motor, a brake, or various sensors, but rather generates data based on data obtained via a communication path, and outputs the generated data via the communication path. Accordingly, a wire harness or the like that connects the substitute unit and the control-target in-vehicle apparatus is not required, and the wire routing in the vehicle can be simplified.

The substitution apparatus according to one aspect of the present disclosure, wherein an external communication apparatus for communicating with an external server outside the vehicle is implemented in the vehicle, and the control unit obtains the program from the external server via the external communication apparatus, and applies the obtained program to the substitute unit.

In this aspect, the control unit obtains a program from the external server via the external communication apparatus. Accordingly, even if the program for exhibiting functions otherwise normally performed by the specified abnormal in-vehicle control apparatus is not stored in the storage unit of the substitution apparatus, the program can be obtained from the external server and applied to the substitute unit.

The substitution apparatus according to one aspect of the present disclosure, wherein the control unit performs restoration processing on the disabled in-vehicle control apparatus, and stops the substitution performed by the substitute unit if the disabled in-vehicle control apparatus returns to normal through the restoration processing.

In this aspect, the control unit performs, on the disabled in-vehicle control apparatus, restoration processing in which the disabled in-vehicle control apparatus is restarted or reprogramming processing is executed on the disabled in-vehicle control apparatus, for example. If the disabled in-vehicle control apparatus is returned to normal through the restoration processing, the control unit stops the substitution performed by the substitute unit, and thus the abnormal in-vehicle control apparatus can be efficiently restored.

The substitution apparatus according to one aspect of the present disclosure, wherein the substitute unit uses a virtual operating system to generate a virtual environment, and the program is executed in the virtual environment.

In this aspect, a virtual environment is generated in the substitute unit by the virtual operating system, and the program is executed in the virtual environment. Accordingly, even if there is a difference between the hardware configurations of the substitute unit and the substituted in-vehicle control apparatus, for example, the difference can be absorbed by a virtual environment realized by the virtual operating system, and the substitute unit can efficiently substitute for various types of in-vehicle control apparatuses.

The substitution apparatus according to one aspect of the disclosure, wherein the number of virtual environments that are generated corresponds to the number of disabled in-vehicle control apparatuses, the number of programs is the same as the number of disabled in-vehicle control apparatuses, and the programs are each executed in a different one of the virtual environments that were generated.

In this aspect, the number of virtual environments that are generated corresponds to the number of specified abnormal in-vehicle control apparatuses, and programs corresponding to the specified abnormal in-vehicle control devices are respectively executed in the generated virtual environments. Accordingly, even if the substitute unit is physically constituted by a single apparatus, the substitution apparatus including the substitute unit can simultaneously substitute for a plurality of in-vehicle control apparatus.

A substitution control program according to one aspect of the present disclosure is for causing a computer to execute processing for: specifying an abnormal in-vehicle control apparatus based on transmission data transmitted from a plurality of in-vehicle control apparatuses installed in a vehicle, disabling the specified abnormal in-vehicle control apparatus, and substituting for the disabled in-vehicle control apparatus by executing a program for exhibiting a function otherwise normally executed by the specified abnormal in-vehicle control apparatus.

In this aspect, the computer can be made to function as the substitution apparatus.

A substitution method according to one aspect of the present disclosure is for: specifying an abnormal in-vehicle control apparatus based on transmission data transmitted from a plurality of in-vehicle control apparatuses installed in a vehicle, disabling the specified abnormal in-vehicle control apparatus, and substituting for the disabled in-vehicle control apparatus by executing a program for exhibiting a function otherwise normally executed by the specified abnormal in-vehicle control apparatus.

In this aspect, a substitution method for substituting for a function of an ECU when an abnormal ECU is detected can be provided.

The following specifically describes the present disclosure based on the drawings illustrating embodiments thereof. A substitution apparatus 6 according to embodiments of the present disclosure will be described below with reference to the drawings. Note that the present disclosure is not limited to these examples, but is indicated by the claims, and all changes that come within the meaning and range of equivalency of the claims are intended to be embraced therein.

Embodiment 1

Figure 1:
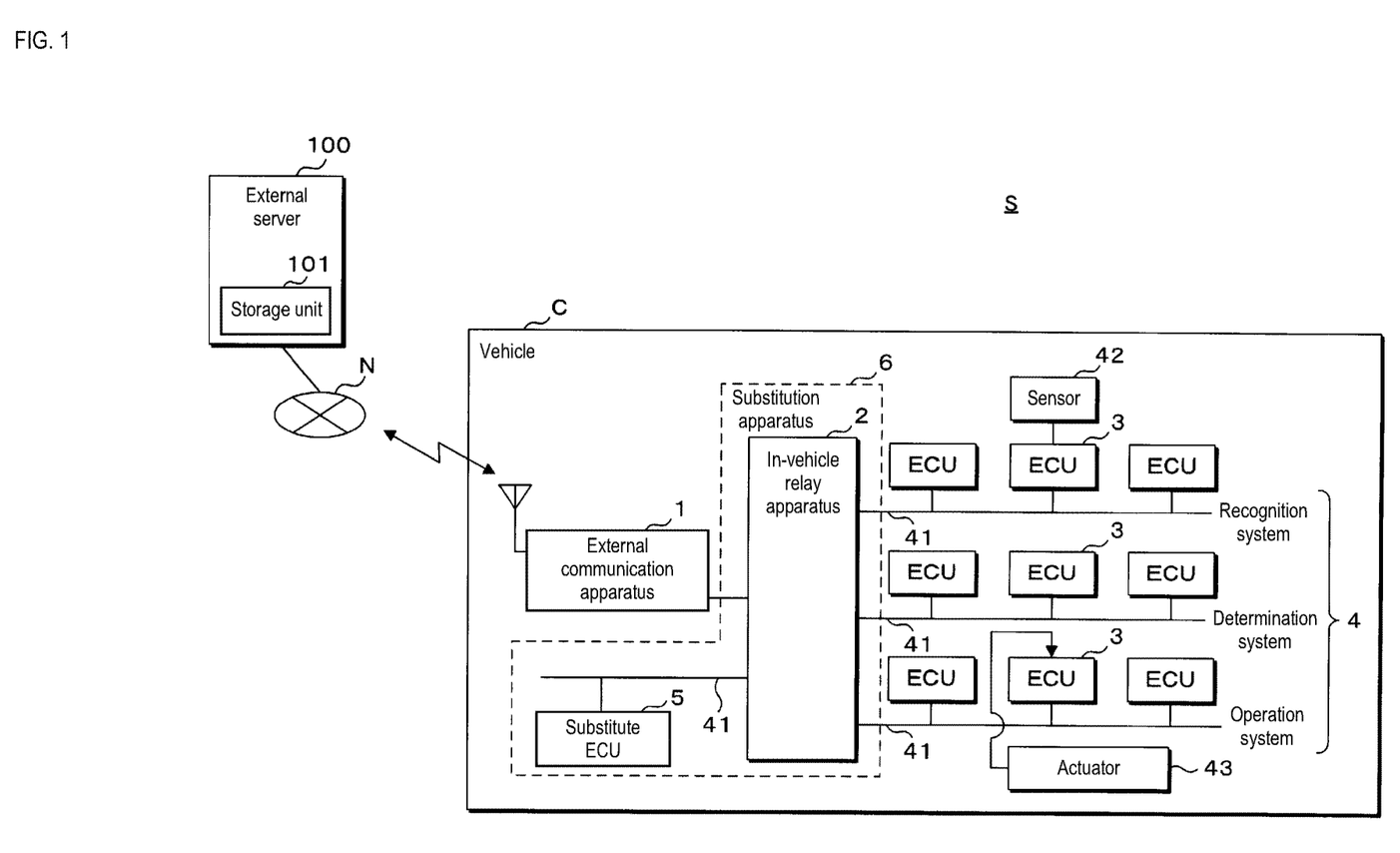
FIG. 1 is a schematic diagram illustrating an example of a configuration of an in-vehicle control apparatus substitution system, which includes a substitution apparatus, according to Embodiment 1.
Figure 2:
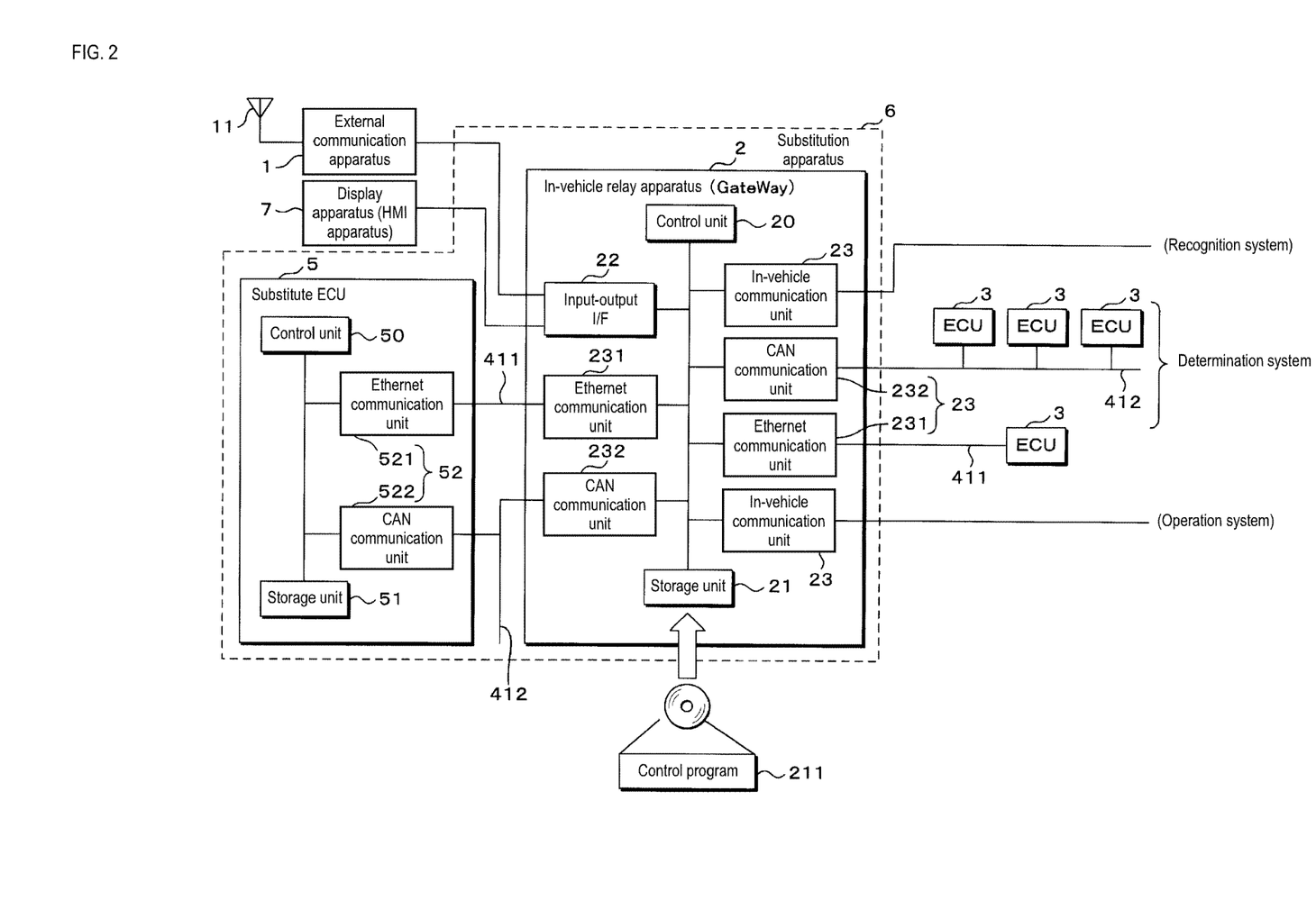
FIG. 2 is a block diagram illustrating an example of a physical configuration of the substitution apparatus.

An embodiment is described below based on the drawings. FIG. 1 is a schematic diagram illustrating an example of a configuration of an in-vehicle control apparatus substitution system S, which includes a substitution apparatus 6, according to Embodiment 1. FIG. 2 is a block diagram illustrating an example of a physical configuration of the substitution apparatus 6.

The in-vehicle control apparatus substitution system S includes the substitution apparatus 6 for installation in a vehicle and an external communication apparatus 1, and applies a program obtained from an external server 100 connected to the in-vehicle control apparatus substitution system S via an external network N to a substitute ECU 5 (substitute unit) included in the substitution apparatus 6 to substitute for any one in-vehicle ECU 3 among in-vehicle ECUs 3 (Electronic Control Unit/in-vehicle control apparatus) implemented in a vehicle C.

The external server 100 is, for example, a computer such as a server or the like externally connected to the external network N, which is the Internet, a public network, etc., and is provided with a storage unit 101 realized by a RAM (Random Access Memory), a ROM (Read Only Memory), a hard disk, or the like. A program or data for controlling an in-vehicle ECU 3 is stored in the storage unit 101 of the external server 100, the program or data having been created by the manufacturer or the like of the in-vehicle ECU 3. The program or data is transmitted to the vehicle C as an update program, and is used to update a program or data of an in-vehicle ECU 3 installed in the vehicle C. The external server 100 configured in this manner is also called an OTA (Over The Air) server. As a result of an in-vehicle ECU 3 installed in the vehicle C obtaining the update program transmitted wirelessly from the external server 100, and applying the update program as a program to be executed, the program executed by the receiving ECU can be updated (re-programmed). A later-described program (substitute program) to be applied to the substitute ECU 5 is stored in the storage unit 101 of the external server 100.

The external communication apparatus 1, the substitution apparatus 6, a display apparatus 7, and a plurality of in-vehicle ECUs 3 for controlling various in-vehicle devices are installed in the vehicle C. The substitution apparatus 6 includes an in-vehicle relay apparatus 2 and the substitute ECU 5. The in-vehicle relay apparatus 2 and the external communication apparatus 1 are communicably connected to each other by a wire harness such as a serial cable. The relay apparatus 2 and the in-vehicle ECUs 3 are communicably connected to each other via communication lines 41 and an in-vehicle LAN 4 that support a communication protocol such as CAN (Control Area Network; registered trademark) or Ethernet (registered trademark).

The external communication apparatus 1 includes an external communication unit (not shown) and an input-output I/F (not shown) for communicating with the in-vehicle relay apparatus 2. The external communication unit is a communication apparatus for performing wireless communication using a mobile radio communication protocol such as 3G, LTE, 4G, or WiFi, and transmits/receives data to/from the external server 100 via an antenna 11 connected to the external communication unit. Communication between the external communication apparatus 1 and the external server 100 is performed via the external network N, which is a public network or the Internet. An input-output I/F is a communication interface for performing, for example, serial communication with the in-vehicle relay apparatus 2. The external communication apparatus 1 and the in-vehicle relay apparatus 2 communicate with each other via the input-output I/F and a wire harness such as a serial cable connected to the input-output I/F. In the present embodiment, the external communication apparatus 1 is a separate apparatus from the in-vehicle relay apparatus 2, and these apparatuses are communicably connected to each other by the input-output I/F and the like, but the present invention is not limited to this. The external communication apparatus 1 may be built into the in-vehicle relay apparatus 2 as a constituent part of the in-vehicle relay apparatus 2.

The substitution apparatus 6 includes the in-vehicle relay apparatus 2 and the substitute ECU 5, and specifies an abnormal in-vehicle ECU 3 based on transmission data transmitted from the in-vehicle ECUs 3, disables the specified abnormal in-vehicle ECU 3, and substitutes for the disabled in-vehicle ECU 3 by applying a program (substitute program) for exhibiting the functions otherwise normally executed by the specified abnormal in-vehicle ECU 3, to the substitute ECU 5.

The in-vehicle relay apparatus 2 includes a control unit 20, a storage unit 21, an input-output I/F 22, and in-vehicle communication units 23. The in-vehicle relay apparatus 2 is a gateway (repeater) that integrates segments of a system realized by the plurality of communication lines 41 of recognition-system in-vehicle ECUs 3, determination-system in-vehicle ECUs 3, operation-system in-vehicle ECUs 3, and the like, and relays communication between the in-vehicle ECUs 3 in these segments. Also, the in-vehicle relay apparatus 2 may be configured as a functional unit of a body ECU that performs overall control of the vehicle C. The in-vehicle relay apparatus 2 may be configured as an apparatus (reprogramming master) that obtains, from the external communication apparatus 1, an update program received from the external server 100 by the external communication apparatus 1 through wireless communication, and transmits the obtained update program to a predetermined in-vehicle ECU 3 (in-vehicle ECU 3 to be updated) via the in-vehicle LAN 4.

The control unit 20 is constituted by a CPU (Central Processing Unit), an MPU (Micro Processing Unit), or the like and is configured to perform various types of control processing, arithmetic processing, and the like by reading out and executing a control program and data stored in advance in the storage unit 21. The control unit 20 of the in-vehicle relay apparatus 2 functions as the control unit of the substitution apparatus 6.

As a result of the control unit 20 (control unit of the substitution apparatus 6) of the in-vehicle relay apparatus 2 executing a control program stored in the storage unit 21, the control unit 20 functions as a determining unit that determines whether or not transmission data is abnormal based on transmission data received from the in-vehicle ECUs. As a result of the control unit 20 (control unit of the substitution apparatus 6) of the in-vehicle relay apparatus 2 executing a control program stored in the storage unit 21, the control unit 20 functions as a specifying unit that specifies the abnormal in-vehicle ECU that is the transmission source of transmission data determined as being abnormal. As a result of the control unit 20 (control unit of substitution apparatus 6) of the in-vehicle relay apparatus 2 executing a control program stored in the storage unit 21, the control unit 20 functions as a disabling unit that disables the specified abnormal in-vehicle ECU. As a result of the control unit 20 (control unit of the substitution apparatus 6) of the in-vehicle relay apparatus 2 executing a control program stored in the storage unit 21, the control unit 20 functions as a substitute program application unit that applies a program (substitute program) for exhibiting functions otherwise normally executed by the specified abnormal in-vehicle ECU, to the substitute ECU 5. As a result of the control unit 20 (control unit of the substitution apparatus 6) of the in-vehicle relay apparatus 2 executing a control program stored in the storage unit 21, the control unit 20 functions as an obtaining unit that obtains, via the external communication apparatus 1, a program for an in-vehicle ECU 3 transmitted from the external server 100 or a program (substitute program) to be applied to the substitute ECU 5.

The storage unit 21 is constituted by a volatile memory element such as a RAM (Random Access Memory), or a non-volatile memory element such as a ROM (Read Only Memory), an EEPROM (Electrically Erasable Programmable ROM), or a flash memory, and control programs and data that is referred to during processing are stored therein in advance. A control program stored in the storage unit 21 may be a stored control program read from a readable recording medium 211 by the in-vehicle relay apparatus 2. Also, a control program may be downloaded from an un-shown external computer connected to an un-shown communication network and stored in the storage unit 21.

The storage unit 21 stores relay path information (a routine table) to be used when relay processing is performed for communication between in-vehicles ECUs 3 or for communication between an in-vehicle ECU 3 and the external server 100. The format of the relay path information is determined based on a communication protocol. If the communication protocol is CAN, CAN relay path information is to include a message identifier (CAN-ID) included in a CAN message, and a relay address (I/O port number of a CAN communication unit 232) associated with the CAN-ID. If the communication protocol is TCP/IP, TCP/IP relay path information is to include a transmission address (MAC address or IP address) included in an IP packet, and a relay address (physical port number of an Ethernet communication unit 231) associated with the transmission address.

While described in detail later, the control unit 20 may change the relay path information based on execution or stoppage of substitution processing performed by the substitute ECU 5. In other words, while the substitution processing is stopped by the substitute ECU 5, the control unit 20 may, for example, remove the substitute ECU 5 from the relay path information, and ensure that the substitute ECU 5 is not included in communication paths of communication made between in-vehicles ECU 3 or between an in-vehicle ECU 3 and the external server 100. While the substitute ECU 5 is executing the substitution processing, the control unit 20 includes the substitute ECU 5 in the relay path information, and ensures that the substitute ECU 5 is included in communication paths (paths for relaying communication between in-vehicle ECUs 3 or between an in-vehicle ECU 3 and the external server 100) of communication made between in-vehicles ECU 3 or between an in-vehicle ECU 3 and the external server 100. By removing the substitute ECU 5 from the relay path information while the substitution processing is stopped by the substitute ECU 5, the substitute ECU 5 can be kept from being attacked by an external apparatus outside the vehicle or an unauthorized in-vehicle ECU 3, due to the substitute ECU 5 not being included in the relay paths.

The storage unit 21 stores programs for the in-vehicle ECUs 3 transmitted from the external server 100. The storage unit 21 stores the program (substitute program) to be applied to the substitute ECU 5. While described in detail later, by making the hardware specifications of the substitute ECU 5 and the hardware specifications of the in-vehicle ECUs 3 the same, or making the hardware specifications thereof compatible with each other, the program for the in-vehicle ECU 3 transmitted from the external server 100 can be used as the program (substitute program) to be applied to the substitute ECU 5

The storage unit 21 stores configuration information (vehicle configuration information) regarding all in-vehicle ECUs 3 installed in the vehicle C. The configuration information (vehicle configuration information) regarding each in-vehicle ECU 3 stored in the storage unit 21 includes, for example, the manufacturing number (serial number) of the in-vehicle ECU 3, the ECU-part number (model number), the software part number, the current version program, the old version program, the number of work banks, the work banks, the MAC (Media Access Control) address, the IP address, the date and time of the previous completed update, the reprogramming status, and the VIN (Vehicle Identification number). Also, in the case were an in-vehicle ECU 3 is connected by a CAN, the configuration information of the in-vehicle ECU 3 may include a CAN-ID used (added) when the in-vehicle ECU 3 transmits a message. The vehicle configuration information is managed by associating it with an ECU-ID realized by a serial number set such that there are no duplicates between individual in-vehicle ECUs 3, and is stored in the storage unit 21 as data in a table format, for example. At a predetermined timing such as when the IG switch is turned on or off, the control unit 20 regularly obtains configuration information regarding each in-vehicle ECU 3 from all of the in-vehicle ECUs 3 installed in the vehicle C or from a specific in-vehicle ECU 3, and stores the configuration information in the storage unit 21.

The control unit 20 can specify the program of the in-vehicle ECU 3 that is to be substituted for by referring to information including the software part number and the current version program included in the vehicle configuration information stored in the storage unit 21. The control unit 20 may specify the program (substitute program) to be applied to the substitute ECU 5 based on the aforementioned specified program. Also, ECU-IDs that uniquely identify each in-vehicle ECU 3 and a program (substitute program) to be applied to the substitute ECU when substituting the corresponding ECU-ID may be stored in association with each other in the storage unit 21, and the control unit 20 may specify the substitute program based on the ECU-ID.

Similarly to an input-output I/F 22 of the external communication apparatus 1, the input-output I/F 22 is a communication interface for performing serial communication, for example. The in-vehicle relay apparatus 2 is communicably connected, via the input-output I/F 22, to the external communication apparatus 1, the display apparatus 7 (HMI apparatus), and an IG switch (not shown) that starts and stops the vehicle C.

The in-vehicle communication units 23 are input-output interfaces (CAN communication unit 232 and Ethernet communication unit 231) that use a communication protocol such as CAN (Control Area Network) or Ethernet (registered trademark), and the control unit 20 communicates with the in-vehicle ECUs 3 connected to the in-vehicle LAN 4 or another in-vehicle device such as a relay apparatus, via the in-vehicle communication units 23.

The Ethernet communication unit 231 is an Ethernet PHY unit that handles TCP/IP packets transmitted via an Ethernet cable 411 such as 100BASE-T1 or 1000BASE-T1.

The CAN communication unit 232 handles CAN messages transmitted via a CAN bus 412, and is a CAN transceiver that receives waveforms according to a potential difference of a differential voltage on the CAN bus 412, which is constituted by a high wire and a low wire, and decodes the received waveform into a signal expressed as a bit stream of 1s and 0s. Also, the CAN communication unit 232 may include a CAN transceiver and a CAN controller.

A plurality of in-vehicle communication units 23 (Ethernet communication unit 231, CAN communication unit 232) are provided, and the communication lines 41 (Ethernet cable 411, CAN bus 412) that form the in-vehicle LAN 4 are respectively connected to the in-vehicle communication units 23. By providing a plurality of in-vehicle communication units 23 in this manner, the in-vehicle LAN 4 is divided into a plurality of segments, and an in-vehicle ECU 3 is connected to each segment according to the function (recognition-system function, determination-system function, and operation-system function) of the in-vehicle ECU 3.

The substitute ECU 5 functions as a substitute unit in the substitution apparatus 6 based on instructions from the control unit 20 (control unit of the substitution apparatus 6) of the in-vehicle relay apparatus 2. Similarly to the in-vehicle relay apparatus 2, the substitute ECU 5 includes a control unit 50, a storage unit 51, and in-vehicle communication units 52. Similarly to the in-vehicle relay apparatus 2, the storage unit 51 is constituted by volatile and non-volatile memory elements, and stores a program (substitute program) that exhibits functions similar to those of the substituted in-vehicle ECU 3. Similarly to the in-vehicle relay apparatus 2, the control unit 50 is constituted by a CPU or the like, and by reading out and executing the program (substitute program) stored in the storage unit 51, performs processing related to control of in-vehicle devices and the like and substitutes for the disabled in-vehicle ECU 3.

Similarly to the in-vehicle relay apparatus 2, the in-vehicle communication units 52 include at least one of an Ethernet communication unit 521 and a CAN communication unit 522, and the substitute ECU 5 communicates with the control unit 20 (control unit of the substitution apparatus 6) of the in-vehicle relay apparatus 2 via the Ethernet communication unit 521 or the CAN communication unit 522.

It is desirable that the in-vehicle communication unit 52 includes the Ethernet communication unit 521 and the CAN communication unit 522, and the substitute ECU 5 is connected to the in-vehicle relay apparatus 2 via two in-vehicle communication units 52, namely the Ethernet communication unit 521 and the CAN communication unit 522. As a result of the substitute ECU 5 including the Ethernet communication unit 521 and the CAN communication unit 522, two in-vehicle ECUs 3, namely an in-vehicle ECU 3 provided with only an Ethernet communication unit and an ECU 3 provided with only a CAN communication unit, can be substituted with the substitute ECU 5.

It is desirable that the in-vehicle communication units 23 (Ethernet communication unit 231 and CAN communication unit 232) of the in-vehicle relay apparatus 2 connected to the in-vehicle communication units 52 (Ethernet communication unit 521 and CAN communication unit 522) of the substitute ECU 5 are in-vehicle communication units 23 that are different from the in-vehicle communication units 23 (Ethernet communication unit 231 and CAN communication unit 232) connected to the in-vehicle ECUs 3. By making the in-vehicle communication units 23 connected to the substitute ECU 5 different from the in-vehicle communication units 23 connected to the in-vehicle ECUs 3, the substitute ECU 5 can be connected to a segment other than the segments to which the in-vehicle ECUs 3 are connected, and the communication bandwidth between the substitute ECU 5 and the in-vehicle relay apparatus 2 can be reliably secured.

The substitute ECU 5 is shown in the drawings as a separate body from the in-vehicle relay apparatus 2, but is not limited to being a separate body. The substitute ECU 5 may be built into the casing of the in-vehicle relay apparatus 2 and be integrated with the in-vehicle relay apparatus 2. In this case, the in-vehicle relay apparatus 2 with the built-in substitute ECU 5 corresponds to the substitution apparatus 6.

The control unit (control unit of the substitution apparatus 6) that controls the substitution processing performed by the substitute ECU 5 was described as being the control unit 20 of the in-vehicle relay apparatus 2, but the present invention is not limited to this. A substitution apparatus 6 that includes a control unit that controls substitution processing performed by the substitute ECU 5 may be a dedicated apparatus configured separately from the in-vehicle relay apparatus 2. The dedicated apparatus is communicably connected to the in-vehicle relay apparatus 2 and the substitute ECU 5, and transmits a program (substitute program) obtained via the in-vehicle relay apparatus 2 to the substitute ECU 5 and applies the program to the substitute ECU 5. Also, a configuration may be employed where the control unit 20 of the in-vehicle relay apparatus 2 and the control unit 50 of the substitute ECU 5 cooperate to exhibit the functions of the control unit of the substitution apparatus 6.

The program (substitute program) applied to the substitute ECU 5 was described as being obtained by the in-vehicle relay apparatus 2 from the external server 100 via the external communication apparatus 1, but the present invention is not limited to this. The number or type of programs (substitute programs) to be applied to the substitute ECU 5 may be more than one according to the number of in-vehicle ECUs 3 that are to be substituted for, and all or some of the substitute programs may be stored in advance in the storage unit 21 of the in-vehicle relay apparatus 2 or the storage unit 51 of the substitute ECU 5. In this case, the control unit 20 of the in-vehicle relay apparatus 2 refers to the storage unit 21 thereof to obtain a substitute program, and applies the obtained substitute program to the substitute ECU 5. In the case where the substitute programs are stored in the storage unit 51 of the substitute ECU 5 in advance, the control unit 20 of the in-vehicle relay apparatus 2 may apply a substitute program stored in the storage unit 51 of the substitute ECU 5 to the substitute ECU 5 by transmitting, for example, an application instruction signal to the substitute ECU 5.

Similarly to the substitute ECU 5, each in-vehicle ECU 3 includes a control unit (not shown), a storage unit (not shown), and an in-vehicle communication unit (not shown). The storage unit is constituted by a volatile memory element such as a RAM (Random Access Memory), or a non-volatile memory element such as a ROM (Read Only Memory), an EEPROM (Electrically Erasable Programmable ROM), or a flash memory, and stores a program or data regarding the in-vehicle ECU 3. The program or data is to be updated by an update program transmitted from the in-vehicle relay apparatus 2. Also, the storage unit stores the configuration information of the corresponding ECU. Similarly to the substitute ECU 5 and the in-vehicle relay apparatus 2, the in-vehicle communication unit is an Ethernet communication unit or a CAN communication unit, and the in-vehicle ECUs 3 communicate with the in-vehicle relay apparatus 2 (substitution apparatus 6) via the corresponding in-vehicle communication units.

The present invention is not limited to the case where all in-vehicle ECUs 3 installed in the vehicle C are substituted with the substitute ECU 5. Some of the in-vehicle ECUs 3 installed in the vehicle C may be substituted with the substitute ECU 5. The hardware specifications of the in-vehicle ECUs 3 that are to be substituted with the substitute ECU 5 may have the same hardware specifications as the substitute ECU 5, or the hardware specifications thereof may be compatible with each other. By making the hardware specifications thereof the same or making the hardware specifications thereof compatible with each other, the substitute ECU 5 can execute a program that is the same program as that executed by an in-vehicle ECU 3.

As shown in FIGS. 1 and 2, the in-vehicle ECUs 3 may be classified according to function into, for example, a recognition system, a determination system, or an operation system, by executing a program stored in the storage unit thereof.

A recognition-system in-vehicle ECU 3 is connected to a sensor 42 such as a camera, an infrared sensor, or a LIDAR (Light Detection and Ranging), and performs, for example, digital conversion on an output value output from the sensor 42, and transmits (outputs) the resulting value to a determination-system in-vehicle ECU 3 via the in-vehicle LAN 4.

The determination-system in-vehicle ECU 3, for example, receives (obtains) data transmitted from the recognition-system in-vehicle ECU 3, generates data for exhibiting an automated driving function of the vehicle C based on the received data or performs processing for processing the data, and transmits (outputs) the data thus generated or the like to an operation-system in-vehicle ECU 3 via the in-vehicle LAN 4.

The operation-system in-vehicle ECU 3 is connected to, for example, an actuator 43 (in-vehicle driving apparatus) such as the motor, the engine, or a brake, and receives (obtains) data transmitted from the determination-system in-vehicle ECU 3, controls operations of the actuator based on the received data, and exhibits an automated driving function by performing operations such as travel, stopping, or steering of the vehicle C.

In other words, the determination-system in-vehicle ECU 3 is not connected to the sensor 42 or the actuator 43, and processes data obtained via the in-vehicle LAN 4 or generates data to be output based on the obtained data, and performs processing for outputting the data thus generated, for example, to another in-vehicle ECU 3 such as an operation-system in-vehicle ECU 3. Accordingly, as a result of using the substitute ECU 5 to substitute for the in-vehicle ECU 3 that performs data generation and the like without being directly connected to a determination-system in-vehicle ECU 3 or the like, the sensor 42, or the actuator 43, the substitute ECU 5 and the sensor 42 or the actuator 43 do not need to be directly connected by a wire harness or the like, and wire routing in the vehicle can be simplified.

The display apparatus 7 is an HMI (Human Machine Interface) apparatus such as a car navigation display, for example. The display apparatus 7 is communicably connected to the input-output I/F 22 of the in-vehicle relay apparatus 2 by a harness such as a serial cable. The display apparatus 7 displays data or information output from the control unit 20 of the in-vehicle relay apparatus 2 via the input-output I/F 22.

The substitution apparatus 6 includes the in-vehicle relay apparatus 2 and the substitute ECU 5, and while the substitution apparatus is shown in FIG. 2 as having one substitute ECU 5, the present invention is not limited to this. The substitution apparatus 6 may include two or more substitute ECUs 5. As a result of the substitution apparatus 6 including a plurality of substitute ECUs 5, even if an abnormality occurs in a plurality of in-vehicle ECUs 3 at the same time, each in-vehicle ECU 3 can be substituted with a substitute ECU 5.

Figure 3:
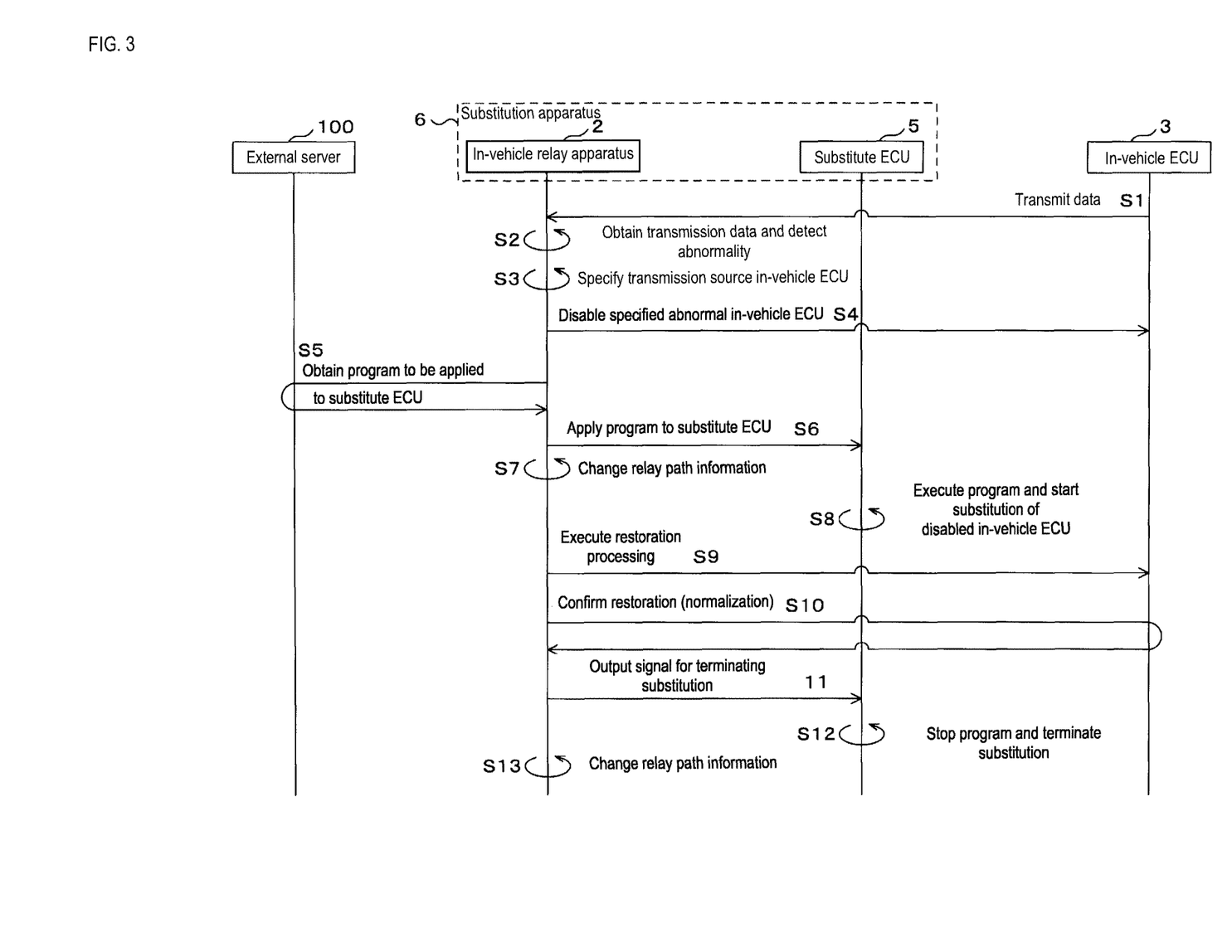
FIG. 3 is a descriptive diagram (sequence diagram) illustrating an example of a mode of substitution realized by the substitution apparatus.

FIG. 3 is a descriptive diagram (sequence diagram) illustrating an example of a mode of substitution performed by the substitution apparatus 6. The processing, shown in FIG. 3, performed by the substitution apparatus 6 to provide a substitute for a disabled in-vehicle ECU 3 will be described using a sequence diagram including processing performed by the external sever 100, the in-vehicle ECU 3, and the substitution apparatus 6 (in-vehicle relay apparatus 2 and substitute ECU 5).

The in-vehicle ECUs 3 transmit data to the in-vehicle relay apparatus 2 (step S1). The in-vehicle ECUs 3 execute a program stored in the storage unit of the same ECU to execute processing regarding control of an in-vehicle apparatus or in-vehicle device, and transmit generated data to another in-vehicle ECU 3 or multicast the generated data.

The in-vehicle relay apparatus 2 obtains the transmitted data and performs abnormality detection (step S2). The in-vehicle relay apparatus 2 performs relay processing, and thus receives data transmitted from all in-vehicle ECUs 3 installed in the vehicle C, and relays the received data based on the header information and relay path information of the thus received data. The in-vehicle relay apparatus 2 functions as a determination unit that determines the validity of the data by performing analysis and the like on the received data, and performs abnormality detection on the received data. Regarding determination of the validity of data, unauthorized data is, for example, a message transmitted from an in-vehicle ECU 3 that has entered an abnormal state due to a virus or the like that has entered from outside the vehicle via the external communication apparatus 1 or the like, or a message transmitted from an unauthorized in-vehicle ECU 3 such as an in-vehicle ECU 3 that has been replaced without authorization. The control unit 20 analyzes the received data and determines the validity thereof by executing a diagnostic program (dialogue process) on the received data or exhibiting the functions of an IDS (Intrusion Detection System). Also, the control unit 20 may determine data transferred in a period different from a transmission period defined for data transmission as being unauthorized data.

The in-vehicle relay apparatus 2 specifies the in-vehicle ECU 3 that is the transmission source of data determined as being abnormal (step S3). The in-vehicle relay apparatus 2 references the header information of the data determined as being abnormal to specify the in-vehicle ECU 3 that is the transmission source of the abnormal data, for example. If the abnormal data is an IP packet, the in-vehicle relay apparatus 2 specifies the in-vehicle ECU 3 (ECU-ID) that is the transmission source by extracting the IP address or MAC address of the transmission source included in the header information, and referencing vehicle configuration information based on the extracted transmission source address. If the abnormal data is a CAN message, the in-vehicle relay apparatus 2 specifies the in-vehicle ECU 33 (ECU-ID) that is the transmission source by extracting a CAN-ID included in the header information, and referencing vehicle configuration information based on the extracted CAN-ID.

The in-vehicle relay apparatus 2 disables the specified abnormal in-vehicle ECU 3 (step S4). As processing for disabling the specified abnormal in-vehicle ECU 3, the in-vehicle relay apparatus 2 transmits a signal for causing forced stoppage to the abnormal in-vehicle ECU 3. The in-vehicle ECU 3 that receives the transmitted signal transitions to a stopped state. The signal for causing forced stoppage may include a signal for cutting off power supplied to the in-vehicle ECU 3 that receives the forced stoppage signal. Also, the in-vehicle relay apparatus 2 may disable the functions of the abnormal in-vehicle ECU 3 by discarding data transmitted from the specified abnormal in-vehicle ECU 3 instead of relaying the data. Furthermore, the in-vehicle relay apparatus 2 may disable the functions of the abnormal in-vehicle ECU 3 by transmitting (broadcasting) a transmission source address such as the MAC address or ECU-ID of the specified abnormal in-vehicle ECU 3 to other in-vehicle ECUs 3, and informing the other ECUs 3 to ignore or discard data that includes the transmission source address.

The in-vehicle relay apparatus 2 obtains a program (substitute program) to be applied to the substitute ECU 5, from the external server 100 (step S5). The in-vehicle relay apparatus 2, for example, refers to the vehicle configuration information and specifies a program otherwise normally executed by the disabled in-vehicle ECU 3, and obtains a program (substitute program) that exhibits functions similar to those of the thus specified program from the external server 100. As described above, if the hardware specifications of the substitute ECU 5 and the hardware specifications of the disabled in-vehicle ECU 3 are the same or are compatible with each other, the program (substitute program) to be applied to the substitute ECU 5 is the same program as the program otherwise normally executed by the disabled in-vehicle ECU 3.

Even if the hardware specifications of the substitute ECU 5 and the hardware specifications of the disabled in-vehicle ECUs 3 are not the same or are incompatible with each other, the in-vehicle relay apparatus 2 can implement (execute) an emulator that absorbs the difference between the hardware specifications as middleware to the substitute ECU 5. The in-vehicle relay apparatus 2 may apply a program, on the emulator, otherwise normally executed by the disabled in-vehicle ECU 3 to the substitute ECU 5 as the substitute program. By implementing an emulator that absorbs the difference between hardware specifications to the substitute ECU 5, a program that is the same as that executed by the substituted in-vehicle ECU 3 can be applied to (executed by) the substitute ECU 5 as a substitute program.

The in-vehicle relay apparatus 2 is not limited to obtaining the substitute program from the external server 100. If a substitute program or an emulator is already stored in the storage unit 21 of the in-vehicle relay apparatus 2, the in-vehicle relay apparatus 2 may reference the storage unit 21 and obtain the substitute program or the like stored in advance therein.

The in-vehicle relay apparatus 2 applies the program (substitute program) to the substitute ECU 5 (step S6). The in-vehicle relay apparatus 2 transmits the obtained substitute program to the substitute ECU 5, and transmits a start-up signal instructing the substitute ECU 5 to execute the substitute program and start up, to the substitute ECU 5. If the substitute program is already stored in the storage unit 51 of the substitute ECU 5, the in-vehicle relay apparatus 2 may transmit information specifying the substitute program to be executed to the substitute ECU 5 and transmit a start-up signal instructing the substitute ECU 5 to execute the specified substitute program and start up, to the substitute ECU 5.

The in-vehicle relay apparatus 2 changes the relay path information (step S7). The in-vehicle relay apparatus 2 changes the relay path information such that the substitute ECU 5 can exhibit the functions executed by the disabled in-vehicle ECU 3. In the case where the substitute ECU 5 is connected to an in-vehicle communication unit 23 different from that of the disabled in-vehicle ECU 3, the substitute ECU 5 communicates with another in-vehicle ECU 3, and thus the in-vehicle relay apparatus 2 changes the association, in the relay path information, between the port number of the in-vehicle communication unit 23 connected to the substitute ECU 5 and the MAC address, IP address, ECU-ID, CAN-ID, or the like of the substitute ECU 5.

The substitute ECU 5 to which the substitute program has been applied executes the substitute program, and initiates substitution of the disabled in-vehicle ECU 3 (step S8). The substitute program is a program for exhibiting functions otherwise normally executed by the disabled in-vehicle ECU 3, and thus the substitute ECU 5 can exhibit functions similar to those of the disabled ECU. Even if the disabled ECU and the substitute ECU 5 are connected to separate in-vehicle communication units 23 in the in-vehicle relay apparatus 2, changing the relay path information enables communication between the substitute ECU 5 and another in-vehicle ECU 3 or the like to be relayed via the in-vehicle relay apparatus 2, and a transparent communication environment realized by the substitute ECU 5 and the other in-vehicle ECU 3 or the like can be secured.

The in-vehicle relay apparatus 2 executes restoration processing on the disabled in-vehicle ECU 3 (step S9). As the restoration processing performed on the disabled in-vehicle ECU 3, the in-vehicle relay apparatus 2, for example, transmits a restart signal to the disabled in-vehicle ECU 3 that causes the disabled in-vehicle ECU 3 to restart (reset). Alternatively, the in-vehicle relay apparatus 2 may obtain a legitimate program for the disabled in-vehicle ECU 3 from the external server 100, and perform processing for applying the obtained program to the disabled in-vehicle ECU 3, that is, perform reprogram processing. Also, the in-vehicle relay apparatus 2 may communicate with the disabled in-vehicle ECU 3 in a diagnosis mode and attempt restoration processing by causing the disabled in-vehicle ECU 3 to execute self-recovery processing.

The in-vehicle relay apparatus 2 confirms that the disabled in-vehicle ECU 3 has been restored (normalized) through the restoration processing (step S10). The in-vehicle relay apparatus 2 confirms that the disabled in-vehicle ECU 3 has been restored (normalized) by, for example, communicating with the restored in-vehicle ECU 3 in a diagnosis mode and obtaining the result of self-diagnosis performed by the restored in vehicle ECU 3.

If the disabled in-vehicle ECU 3 has been restored (normalized), the in-vehicle relay apparatus 2 outputs (transmits) a signal to the substitute ECU 5 for terminating the substitution performed by the substitute ECU 5 (step S11).

The substitute ECU 5 that has obtained (received) the signal for terminating the substitution from the in-vehicle relay apparatus 2 stops the executed substitute program, and terminates the substitution (step S12).

The in-vehicle relay apparatus 2 changes the current relay path information such that it replicates the relay path information of that prior to the substitute ECU 5 initiating the substitution processing (step S13). By changing the current relay path information so that it replicates the relay path information of that prior to the substitute ECU 5 initiating the substitution processing, the in-vehicle ECU 3 that was restored to normal operations can communicate with other in-vehicle ECUs 3.

Figure 4:
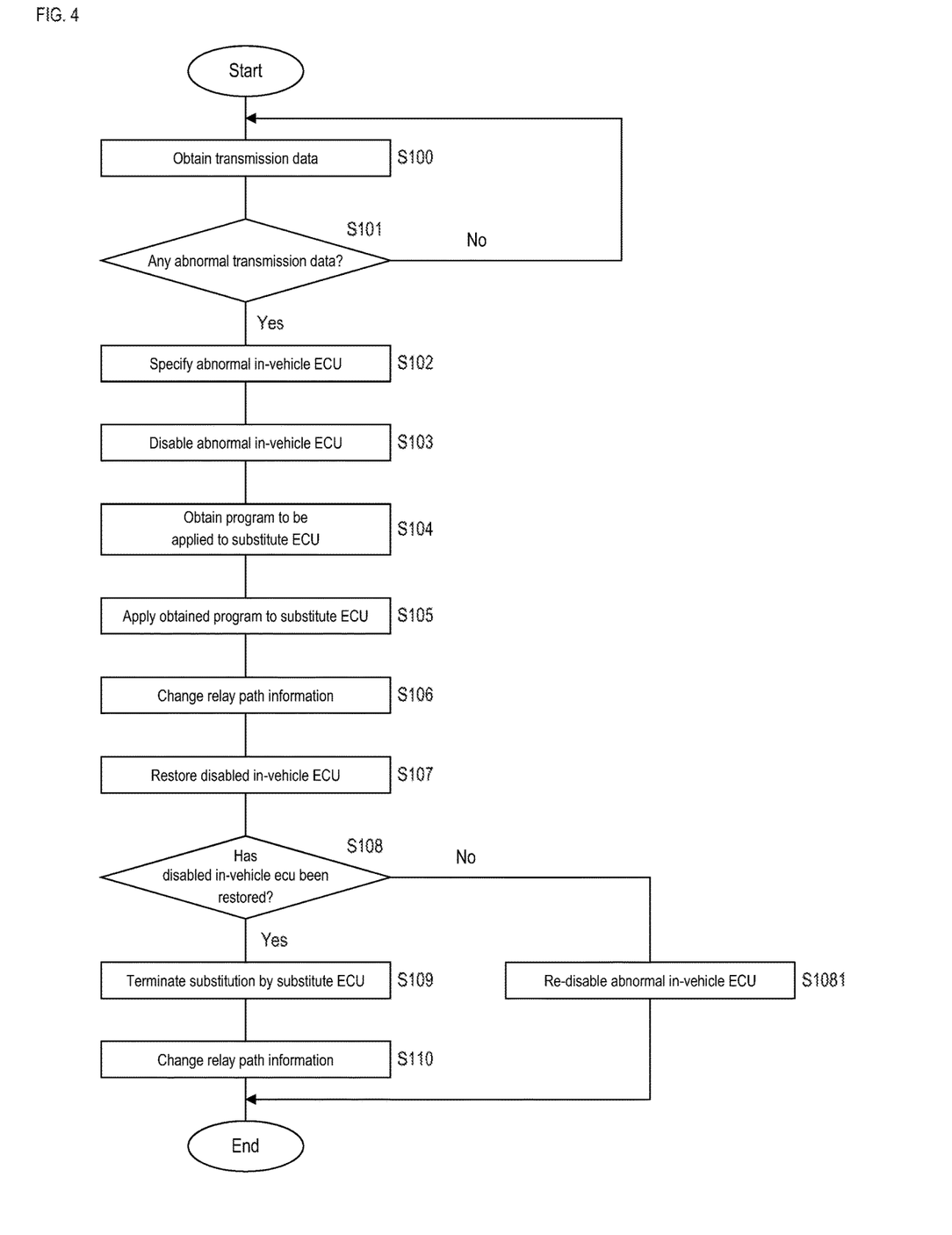
FIG. 4 is a flowchart illustrating an example of processing performed by a control unit of the substitution apparatus.

FIG. 4 is a flowchart illustrating an example of processing performed by the control unit 20 of the substitution apparatus 6. The control unit 20 of the in-vehicle relay apparatus 2 (substitution apparatus 6) regularly performs the following processing when the vehicle C is in a running state (the IG switch is on) or in a stopped state (IG switch is off), for example.

The control unit 20 of the in-vehicle relay apparatus 2 obtains transmission data transmitted from the in-vehicle ECUs 3 (step S100). In relaying communication between the in-vehicle ECUs 3, the control unit 20 receives (obtains) data transmitted from the in-vehicle ECUs 3.

The control unit 20 of the in-vehicle relay apparatus 2 determines whether or not the obtained transmission data is abnormal (step S101). In regards to transmission data (received data) transmitted from the in-vehicle ECU 3, the control unit 20 determines whether or not the obtained transmission data is abnormal based on the transmission timing of the received data, the result of analysis performed by an IDS, or the like.

If the transmission data transmitted from the in-vehicle ECUs 3 is not abnormal (step S101: NO), that is, if the transmission data transmitted from the in-vehicle ECUs 3 is normal, the control unit 20 of the in-vehicle relay apparatus 2 performs loop processing in order to execute the processing in step S100 again.

If there is abnormal transmission data transmitted from an in-vehicle ECU 3 (step S101: YES), the control unit 20 of the in-vehicle relay apparatus 2 specifies the abnormal in-vehicle ECU 3 based on the transmission data (step S102). The control unit 20 extracts the address such as the message identifier (CAN-ID) of the transmission source included in the header information of the obtained transmission data, and refers to the vehicle configuration information to specify the abnormal in-vehicle ECU 3 that is the transmission source of the abnormal transmission data.

The control unit 20 of the in-vehicle relay apparatus 2 disables the abnormal in-vehicle ECU 3 (step S103). The control unit 20 outputs, for example, a signal for forced termination to the specified abnormal in-vehicle ECU 3 and thus disables the abnormal in-vehicle ECU 3. Also, the control unit 20 may disable the abnormal in-vehicle ECU 3 by discarding the data transmitted from the specified abnormal in-vehicle ECU 3, for example.

The control unit 20 of the in-vehicle relay apparatus 2 obtains a program to be applied to the substitute ECU 5 (step S104). The control unit 20 refers to, for example, the vehicle configuration information to specify the program of the disabled in-vehicle ECU 3, and obtains a program (substitute program) that exhibits similar functions to the specified program from the external server 100. Also, if the substitute program is already stored (saved) in a storage area that can be referred to (accessed by) the control unit 20 of the in-vehicle relay apparatus 2, such as the storage unit 21 of the in-vehicle relay apparatus 2, the control unit 20 may obtain (use) the saved substitute program.

The control unit 20 of the in-vehicle relay apparatus 2 applies the obtained program to the substitute ECU 5 (step S105). As a result of the control unit 20 transmitting the obtained program (substitute program) to the substitute ECU 5 and outputting (transmitting) a start-up signal to the substitute ECU 5, the substitute program is applied to the substitute ECU 5. The substitute ECU 5 to which the substitute program has been applied starts up by executing the substitute program and substitutes for the disabled in-vehicle ECU 3 by exhibiting functions similar to that of the disabled in-vehicle ECU 3.

The control unit 20 of the in-vehicle relay apparatus 2 changes the relay path information (step S106). The control unit 20 changes the relay path information stored in advance in the storage unit 21 of the in-vehicle relay apparatus 2 so that the substitute ECU 5 can communicate with other in-vehicle ECUs 3.

The control unit 20 of the in-vehicle relay apparatus 2 attempts to restore the disabled in-vehicle ECU 3 (step S107). The control unit 20, for example, transmits a restart signal to the disabled in-vehicle ECU 3, and attempts restoration processing by executing reprogramming processing or communicating with the disabled in-vehicle ECU 3 in a diagnosis mode and causing the disabled in-vehicle ECU 3 to execute self-recovery processing.

The control unit 20 of the in-vehicle relay apparatus 2 determines whether or not the disabled in-vehicle ECU 3 has been restored (step S108). The control unit 20 determines whether or not the disabled in-vehicle ECU 3 has been restored (normalized) by, for example, communicating with the restored in-vehicle ECU 3 in a diagnosis mode, and obtaining the result of self-diagnosis performed by the restored in-vehicle ECU 3. Also, the control unit 20 may determine whether or not a restarted in-vehicle ECU 3 has been restored to normal (normalized) by causing the disabled in-vehicle ECU 3 to perform reprogram processing and restart, and then analyze the transmission data transmitted from the restarted in-vehicle ECU 3.

In the case where restoration was not successful (step S108: NO), the control unit 20 of the in-vehicle relay apparatus 2 disables the abnormal in-vehicle ECU 3 again (step S1081). If the disabled in-vehicle ECU 3 is not restored (normalized) despite attempts at restoration processing, that is, if the abnormal state of the disabled in-vehicle ECU 3 continues, the control unit 20 re-disables the in-vehicle ECU 3 that is still in an abnormal state.

If the disabled in-vehicle ECU 3 has been restored (step S108: YES), the control unit 20 of the in-vehicle relay apparatus 2 ends substitution performed by the substitute ECU 5 (step S109). If the disabled in-vehicle ECU 3 has been restored (normalized) through restoration processing, the control unit 20 outputs (transmits) a signal to the substitute ECU 5 for terminating substitution, for example. The substitute ECU 5 that has obtained (received) the signal for terminating substitution stops the substitute program that it is executing and terminates substitution.

The control unit 20 of the in-vehicle relay apparatus 2 changes the relay path information (step S110). The control unit 20 changes the current relay path information such that it replicates the relay path information of that prior to the substitute ECU 5 initiating the substitution processing.

The control unit 20 of the in-vehicle relay apparatus 2 ends the processing of this flowchart after executing the processing of step S110 or step S1081. Also, the control unit 20 may perform loop processing in order to execute the processing of step S100 again after executing the processing of step S110. The control unit 20 of the in-vehicle relay apparatus 2 may store, to the storage unit 21, the determination results regarding determination (steps S101 and S108) made in the processing of this flowchart, and information regarding the in-vehicle ECU 3 specified as being abnormal, and output this information to the display apparatus 7 or the external server 100 to make the operator of the vehicle C or the administrator of the external server 100 aware of this information.

The substitution apparatus 6 can disable an abnormal in-vehicle ECU 3 to prevent other in-vehicle apparatuses or the vehicle C from being affected, and can substitute the abnormal in-vehicle ECU 3 with the substitute ECU 5 and cause the substitute ECU 5 to exhibit functions otherwise normally exhibited by the abnormal in-vehicle ECU 3.

Accordingly, in the case where the vehicle C has an automated driving function, even if any one of the in-vehicle ECUs 3 is abnormal, the abnormal in-vehicle ECU 3 can be disabled, and the automated driving function can be continued by substituting the disabled in-vehicle ECU 3 with the substitute ECU 5.

The substitution apparatus 6 specifies the program executed by the in-vehicle ECU 3 to be substituted for based on vehicle configuration information stored therein. The substitution apparatus 6 obtains, from the external server 100, a program (substitute program) that exhibits functions similar to that of the specified program when applied to the substitute ECU 5, and thus substitute programs corresponding to a plurality of in-vehicle ECU 3 programs can be obtained without the storage area of the storage unit 21 of the in-vehicle relay apparatus 2 being placed under undue stress.

Once the disabled in-vehicle ECU 3 has been substituted with the substitute ECU 5, the substitution apparatus 6 attempts to restore the disabled in-vehicle ECU 3, and if the disabled in-vehicle ECU 3 is restored (normalized), substitution performed by the substitute ECU 5 is terminated. Accordingly, the functions of the abnormal in-vehicle ECU 3 can be continued through substitution by the substitute ECU 5 while the abnormal in-vehicle ECU 3 is being efficiently restored.

Embodiment 2

Figure 5:
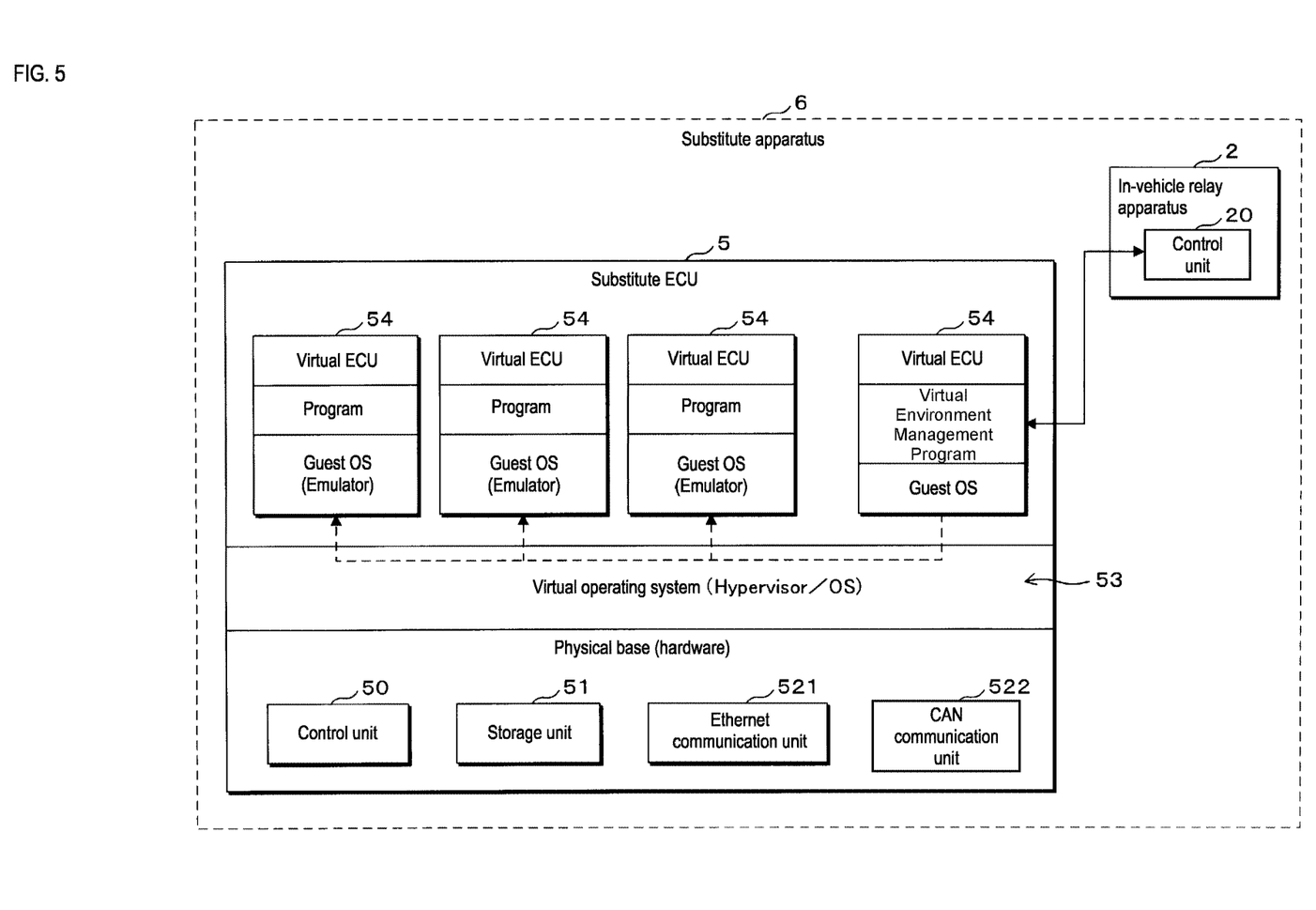
FIG. 5 is a block diagram illustrating an example of a logical configuration of a substitution apparatus according to Embodiment 2 (virtual environment).

FIG. 5 is a block diagram showing an example of a logical configuration of the substitution apparatus 6 according to Embodiment 2. The substitution apparatus 6 according to Embodiment 2 differs from that in Embodiment 1 in that the substitute program executed by the substitute ECU 5 is executed in a virtual environment. Similarly to the substitution apparatus 6 in Embodiment 1, the substitution apparatus 6 according to Embodiment 2 includes the in-vehicle relay apparatus 2 and the substitute ECU 5 (substitute unit). The in-vehicle relay apparatus 2 included in the substitution apparatus 6 in Embodiment 2 has a configuration and functions that are similar to that of the substitution apparatus 6 in Embodiment 1, and a detailed description thereof is omitted.

Similarly to the substitute ECU 5 in Embodiment 1, the substitute ECU 5 included in the substitution apparatus 6 according to Embodiment 2 includes a control unit 50, a storage unit 51, and an in-vehicle communication unit 52, the in-vehicle communication unit 52 including one of or both an Ethernet communication unit 521 and a CAN communication unit 522. That is, the hardware configurations of the substitute ECU 5 in Embodiment 1 and the substitute ECU 5 in Embodiment 2 are the same.

FIG. 5 illustrates an example of a logical configuration of the substitute ECU 5 according to Embodiment 2, and is a block diagram illustrating an example of a hierarchical structure where a hardware layer (physical base) realized by the control unit 50 and the like is the lowest layer, and the substitute program to be executed in a virtual environment is the top layer.

A virtual operating system 53 (Hypervisor) is stored in the storage unit 51 of the substitute ECU 5, and as a result of the control unit 50 of the substitute ECU 5 starting up using the virtual operating system 53, a plurality of virtual environments can be constructed on the virtual operating system 53. The method of virtualization may be a Hypervisor method as shown in FIG. 5 in which the hardware resources of the control unit 50 or the like are directly accessed by the virtual operating system 53, or a host OS method in which an operation system such as Linux (registered trademark) intermediates between the virtual operation system 53 and the hardware resources.

The substitute ECU 5 started up using the virtual operating system 53 can construct virtual environments using the functions of the virtual operating system 53, and the hardware resources of the control unit 50 or the like provided in the substitute ECU 5 can be allocated to the virtual environments. Each virtual environment allocated with a hardware resource is provided with a virtual control unit, storage unit (virtual storage unit), and in-vehicle communication unit (virtual in-vehicle communication unit), and functions as a virtual ECU 54.

A guest OS such as Ubuntu (registered trademark) is stored in the virtual storage unit of each virtual ECU 54, and as a result of each virtual ECU 54 starting up the guest OS and executing a substitute program on the guest OS, disabled in-vehicle ECUs can be substituted for. As mentioned above, the virtual storage units themselves are storage areas of the storage unit 51 allocated to each of the virtual ECUs 54, and thus, it goes without saying that the guest OS is also stored in the storage unit 51 similarly to the virtual operating system 53. If the running environment of a program of the guest OS and the running environment of the program of the disabled ECU that is to be substituted for are different, a simulator that absorbs the difference between the running environments may be started up as middleware on the guest OS. Also, if a virtual operating system 53 employing a container method is used, the guest OS is not required, and a configuration is possible in which a container is formed on the virtual operating system 53, an emulator is started up on the container, and the emulator absorbs the difference between running environments.

The substitute ECU 5 started up using the virtual operating system 53 executes, on any one virtual ECU 54 of the constructed virtual environments (virtual ECUs 54), a program (virtual environment management program) for managing the corresponding virtual environment. The virtual ECU 54 executing the virtual environment management program communicates with the control unit 20 of the in-vehicle relay apparatus 2 and, by executing commands or the like prepared in the virtual operating system 53 based on a signal transmitted from the in-vehicle relay apparatus 2, generates a new virtual ECU 54 or deletes a generated virtual ECU 54. In other words, the virtual ECU 54 executing the virtual environment management program may also include a control panel of the virtual operating system 53.

If a substitute program is transmitted from the in-vehicle relay apparatus 2, the virtual ECU 54 executing the virtual environment management program can generate a new virtual ECU 54, and apply the substitute program to the substitution apparatus 6 by executing the substitute program obtained from the in-vehicle relay apparatus 2 on the generated virtual ECU 54. If the virtual ECU 54 receives a signal for terminating substitution from the in-vehicle relay apparatus 2, the virtual ECU 54 executing the virtual environment management program may, based on the received signal, stop the substitute program of the virtual ECU 54 executing the substitution processing or delete a generated virtual ECU 54.

The substitute ECU 5 started up using the virtual operating system 53 can set a virtual ECU 54 that manages all of the virtual environments including generation and deletion of virtual ECUs 54 and the virtual ECU 54 executing the substitute program as separate running environments, and realize stable operation of the virtual ECUs 54 by suppressing interference between the aforementioned virtual ECUs 54.

By using a guest OS or an emulator installed on the virtual operating system 53, the program execution environment of the virtual ECU 54 and the program execution environment of the disabled in-vehicle ECU 3 can be the same or made compatible with each other. Accordingly, even if the hardware specifications of the in-vehicle ECUs 3 and the substitute ECU 5 differ, the difference between the specifications can be absorbed, and the same program as the program of the in-vehicle ECU 3 that is to be substituted for can be executed by the virtual ECU 54 as the substitute program.

As shown in FIG. 5, the substitute ECU 5 can generate a plurality of virtual ECUs 54 in response to an instruction from the control unit 20 of the in-vehicle relay apparatus 2, and execute different substitute programs on each of the generated virtual ECUs 54. Accordingly, even if a plurality of in-vehicle ECUs 3 become abnormal at the same time, one substitute ECU 5 can generate a plurality of virtual ECUs 54 and substitute the plurality of abnormal in-vehicle ECUs 3 with the virtual ECUs 54.

The embodiments disclosed herein are examples in all respects, and are not to be construed as limiting. The scope of the present disclosure is defined by the claims rather than by the meaning of the description above, and all modifications equivalent to and within the scope of the claims are intended to be encompassed.

The invention claimed is:

1. A substitution apparatus for installation in a vehicle in which a plurality of in-vehicle control apparatuses are implemented, the substitution apparatus comprising:
a control unit; and
a substitute unit,
wherein the control unit is configured to control the substitute unit based on transmission data transmitted from the plurality of in-vehicle control apparatuses,
specify an abnormal in-vehicle control apparatus based on the transmission data,
disable the specified abnormal in-vehicle control apparatus, and
apply, to the substitute unit, a program for exhibiting a function otherwise normally executed by the specified abnormal in-vehicle control apparatus,
the substitute unit is configured to substitute for the disabled in-vehicle control apparatus by executing the applied program, and
the control unit does not include the substitute unit in a relay path for relaying the transmission data transmitted from the plurality of in-vehicle control apparatuses, before the program is applied to the substitute unit,
includes the substitute unit in the relay path after applying the program to the substitute unit, and
changes relay path information stored in a storage unit of the own apparatus based on execution or stoppage of substitution processing performed by the substitute unit.

2. The substitution apparatus according to claim 1, wherein the plurality of in-vehicle control apparatuses are communicably connected to the control unit using a CAN or Ethernet communication protocol, and
the substitute unit is communicably connected to the control unit using the CAN and Ethernet communication protocols.

3. The substitution apparatus according to claim 2, wherein the substitute unit substitutes for an in-vehicle control apparatus that performs processing for generating data to be output based on data obtained via a communication path for communication with another in-vehicle control apparatus, and outputting the generated data via the communication path.

4. The substitution apparatus according to claim 2, wherein an external communication apparatus for communicating with an external server outside the vehicle is implemented in the vehicle, and
the control unit obtains the program from the external server via the external communication apparatus, and applies the obtained program to the substitute unit.

5. The substitution apparatus according to claim 2, wherein the control unit performs restoration processing on the disabled in-vehicle control apparatus, and stops the substitution performed by the substitute unit if the disabled in-vehicle control apparatus returns to normal through the restoration processing.

6. The substitution apparatus according to claim 2, wherein the substitute unit uses a virtual operating system to generate a virtual environment, and
the program is executed in the virtual environment.

7. The substitution apparatus according to claim 1, wherein the substitute unit substitutes for an in-vehicle control apparatus that performs processing for generating data to be output based on data obtained via a communication path for communication with another in-vehicle control apparatus, and outputting the generated data via the communication path.

8. The substitution apparatus according to claim 7, wherein an external communication apparatus for communicating with an external server outside the vehicle is implemented in the vehicle, and
the control unit obtains the program from the external server via the external communication apparatus, and applies the obtained program to the substitute unit.

9. The substitution apparatus according to claim 7, wherein the control unit performs restoration processing on the disabled in-vehicle control apparatus, and stops the substitution performed by the substitute unit if the disabled in-vehicle control apparatus returns to normal through the restoration processing.

10. The substitution apparatus according to claim 7, wherein the substitute unit uses a virtual operating system to generate a virtual environment, and
the program is executed in the virtual environment.

11. The substitution apparatus according to claim 1, wherein an external communication apparatus for communicating with an external server outside the vehicle is implemented in the vehicle, and
the control unit obtains the program from the external server via the external communication apparatus, and applies the obtained program to the substitute unit.

12. The substitution apparatus according to claim 11, wherein the control unit performs restoration processing on the disabled in-vehicle control apparatus, and stops the substitution performed by the substitute unit if the disabled in-vehicle control apparatus returns to normal through the restoration processing.

13. The substitution apparatus according to claim 11, wherein the substitute unit uses a virtual operating system to generate a virtual environment, and
the program is executed in the virtual environment.

14. The substitution apparatus according to claim 1, wherein the control unit performs restoration processing on the disabled in-vehicle control apparatus, and stops the substitution performed by the substitute unit if the disabled in-vehicle control apparatus returns to normal through the restoration processing.

15. The substitution apparatus according to claim 14, wherein the substitute unit uses a virtual operating system to generate a virtual environment, and the program is executed in the virtual environment.

16. The substitution apparatus according to claim 1, wherein the substitute unit uses a virtual operating system to generate a virtual environment, and the program is executed in the virtual environment.

17. The substitution apparatus according to claim 16, wherein the number of virtual environments that are generated corresponds to the number of disabled in-vehicle control apparatuses, the number of programs is the same as the number of disabled in-vehicle control apparatuses, and the programs are each executed in a different one of the virtual environments that were generated.

18. A substitution control program for causing a computer to execute processing for:

specifying an abnormal in-vehicle control apparatus based on transmission data transmitted from a plurality of in-vehicle control apparatuses installed in a vehicle, disabling the specified abnormal in-vehicle control apparatus, substituting for the disabled in-vehicle control apparatus by executing a program for exhibiting a function otherwise normally executed by the specified abnormal in-vehicle control apparatus, preventing inclusion of a substitute unit that performs the substitution processing in a relay path for relaying the transmission data transmitted from the plurality of in-vehicle control apparatuses, before the program is executed and the disabled in-vehicle control apparatus is substituted for, including the substitute unit that performs the substitution processing in the relay path after the program is executed and the disabled in-vehicle control apparatus is substituted for, and changing relay path information stored in a storage unit of the own apparatus based on execution or stoppage of the substitution processing.

19. A substitution method comprising:

specifying an abnormal in-vehicle control apparatus based on transmission data transmitted from a plurality of in-vehicle control apparatuses installed in a vehicle, disabling the specified abnormal in-vehicle control apparatus, substituting for the disabled in-vehicle control apparatus by executing a program for exhibiting a function otherwise normally executed by the specified abnormal in-vehicle control apparatus, preventing inclusion of a substitute unit that performs the substitution processing in a relay path for relaying the transmission data transmitted from the plurality of in-vehicle control apparatuses, before the program is executed and the disabled in-vehicle control apparatus is substituted for, including the substitute unit that performs the substitution processing in the relay path after the program is executed and the disabled in-vehicle control apparatus is substituted for, and changing relay path information stored in a storage unit of the own apparatus based on execution or stoppage of the substitution processing.

* * * * *